(12) United States Patent
Mori et al.

(10) Patent No.: US 10,508,160 B2
(45) Date of Patent: Dec. 17, 2019

(54) MODIFIED POLYVINYL ALCOHOL AND WATER-SOLUBLE FILM

(71) Applicant: KURARAY CO., LTD., Kurashiki-shi (JP)

(72) Inventors: Yoko Mori, Akashi (JP); Masaki Kato, La Porte, TX (US); Tatsuya Tanida, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/514,288

(22) PCT Filed: Sep. 18, 2015

(86) PCT No.: PCT/JP2015/004796
§ 371 (c)(1),
(2) Date: Mar. 24, 2017

(87) PCT Pub. No.: WO2016/047126
PCT Pub. Date: Mar. 31, 2016

(65) Prior Publication Data
US 2017/0275394 A1 Sep. 28, 2017

(30) Foreign Application Priority Data
Sep. 26, 2014 (JP) .................... 2014-196402

(51) Int. Cl.
*C08F 8/12* (2006.01)
*B65D 65/46* (2006.01)
*C08J 5/18* (2006.01)
*C08K 5/053* (2006.01)
*C11D 17/04* (2006.01)

(52) U.S. Cl.
CPC ............. *C08F 8/12* (2013.01); *B65D 65/46* (2013.01); *C08J 5/18* (2013.01); *C08K 5/053* (2013.01); *C11D 17/042* (2013.01); *C08J 2329/04* (2013.01)

(58) Field of Classification Search
CPC .. C11D 17/042; C11D 3/3753; C11D 11/0017
See application file for complete search history.

(56) References Cited

U.S. PATENT DOCUMENTS

| 5,019,609 | A | * | 5/1991 | Toyonishi | C08J 5/18 524/224 |
| 5,780,418 | A | * | 7/1998 | Niinaka | A61K 8/02 206/484 |
| 2002/0009596 | A1 | * | 1/2002 | Mizutani | C08J 5/18 428/413 |
| 2002/0182348 | A1 | | 12/2002 | Fujiwara et al. | |
| 2004/0092635 | A1 | | 5/2004 | Kitamura et al. | |
| 2009/0291282 | A1 | * | 11/2009 | Kitamura | C08J 5/18 428/220 |
| 2016/0326285 | A1 | | 11/2016 | Mori et al. | |
| 2017/0259976 | A1 | * | 9/2017 | Lee | B65D 65/46 |

FOREIGN PATENT DOCUMENTS

| EP | 1 251 147 A1 | 10/2002 |
| JP | 63-168437 A | 7/1988 |
| JP | 2-163149 A | 6/1990 |
| JP | 4-71243 U | 6/1992 |
| JP | 4-164998 A | 6/1992 |
| JP | 4-170405 A | 6/1992 |
| JP | 6-340899 A | 12/1994 |
| JP | 9-272773 A | 10/1997 |
| JP | 10-60207 A | 3/1998 |
| JP | 2001-322668 A | 11/2001 |
| JP | 2003-171424 A | 6/2003 |
| JP | 2004-161823 A | 6/2004 |
| JP | 2005-89655 A | 4/2005 |
| JP | 2005-139240 A | 6/2005 |
| JP | 2006-63242 A | 3/2006 |
| WO | 2015/098979 A1 | 7/2015 |

OTHER PUBLICATIONS

International Search Report dated Nov. 24, 2015 in PCT/JP2015/004796 filed Sep. 18, 2015.
Extended European Search Report dated Apr. 26, 2018 in Patent Application No. 15844919.9, 7 pages.
L. Guang-Qi, Production Practice Guide for Process Equipment and Control Engineering, East China Polytechnic University Press, pp. 99-100, 2012. (w/English Translation).

* cited by examiner

*Primary Examiner* — Charles I Boyer
(74) *Attorney, Agent, or Firm* — Oblon, McClelland, Maier & Neustadt, L.L.P.

(57) ABSTRACT

The present invention provides: a water-soluble film that is superior in cold water solubility and in practical properties such as strength and stiffness and that can resist deterioration in various properties such as chemical resistance over time; and a modified polyvinyl alcohol used for the water-soluble film. The present invention relates to a modified polyvinyl alcohol containing 0.05 to 10 mol % of a monomer unit having two carboxyl groups. In $^1$H-NMR spectroscopy of the modified polyvinyl alcohol, an integral (X) from 6.8 to 7.2 ppm and an integral (Y) from 5.3 to 5.5 ppm satisfy the following expression:

$$0.60 \leq X/(X+Y) < 1.0.$$

11 Claims, 1 Drawing Sheet

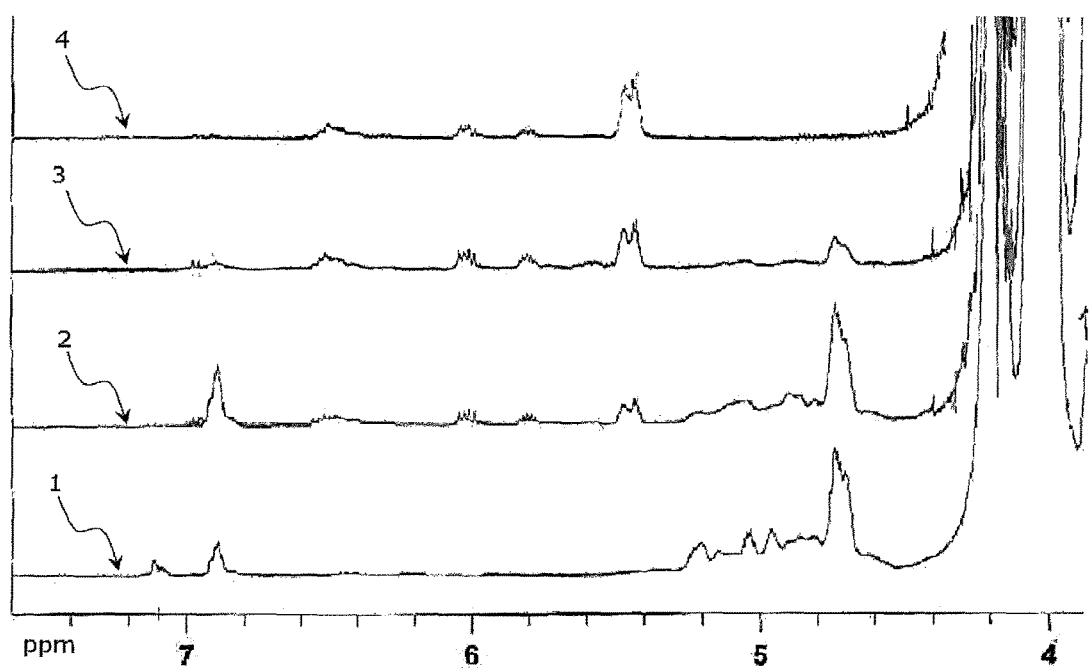

MODIFIED POLYVINYL ALCOHOL AND WATER-SOLUBLE FILM

TECHNICAL FIELD

The present invention relates to a modified polyvinyl alcohol that contains a predetermined amount of a monomer unit having two carboxyl groups and for which certain integrals in $^1$H-NMR spectroscopy satisfy a predetermined condition. The present invention further relates to a water-soluble film and a package that are produced using the modified polyvinyl alcohol.

BACKGROUND ART

Polyvinyl alcohol (which may hereinafter be abbreviated as "PVA") is known as a water-soluble synthetic polymer. PVAs are used as a material for vinylon, which is a synthetic fiber, and also used in a wide variety of applications such as in paper processing, fiber processing, adhesives, stabilizers for emulsion polymerization or suspension polymerization, binders for inorganic substances, and films.

PVA films as mentioned above have come to be used as water-soluble films for hermetically packaging a predefined amount of (for unit packaging of) any of various chemicals, such as agricultural chemicals, laundry detergents, bleaches, toiletry products, and industrial chemicals, to form a package. The package, when used, is put in water to dissolve or disperse the packaged product together with the packaging film in water. The unit packaging offers the following advantages, for example: the package can be used without direct contact with a hazardous chemical; the package can be used without the need for weighing since the amount of the packaged product is predefined; and the need for post-use disposal of a packaging container enclosing the chemical is eliminated.

PVAs with a higher degree of saponification have higher crystallinity and hence a higher content of crystalline portion insoluble in cold water. For this reason, in cold water-soluble films such as those for use in unit packaging, partially-saponified unmodified PVAs have been used instead of so-called "completely-saponified" PVAs which have a high degree of saponification. A water-soluble film produced using a partially-saponified unmodified PVA is characterized, for example, by being highly soluble in cold water and having high mechanical strength.

When any conventional partially-saponified unmodified PVA film is used to package an alkaline or acidic material, acetoxy groups remaining in the partially-saponified unmodified PVA film are saponified during storage, which unfortunately promotes crystallization and makes the film insoluble. Furthermore, when a film produced using a partially-saponified unmodified PVA is used to package a chlorine-containing compound such as an agricultural chemical or disinfectant and the resulting package is left for a long period of time, the film is stained or hardened and, at the same time, undergoes a decrease in solubility over time to become insoluble or poorly-soluble in water so that the chemical as packaged in the film disadvantageously becomes difficult to dissolve or disperse in water. In addition, a film produced using a partially-saponified unmodified PVA lacks sufficient stiffness because of low crystallinity and thus has poor processability.

To solve these problems, Patent Literature 1 discloses a water-soluble film formed from a PVA containing an oxyalkylene group, a sulfonic acid group, or a cationic group. Patent Literature 2 discloses a water-soluble film formed from a composition containing: a modified PVA having a monomer unit containing a carboxyl group and/or sulfonic acid group; and a polyol. Patent Literature 3 discloses a water-soluble film formed from a modified PVA containing a N-vinylamide monomer unit and a carboxyl group and/or lactone ring.

In recent years, a water-soluble film that meets all performance requirements as to cold water solubility, mechanical strength, and chemical resistance has been demanded, for example, in terms of workability and environmental protection. The conventional PVA-containing water-soluble films mentioned above cannot fully meet such performance requirements.

CITATION LIST

Patent Literature

Patent Literature 1: JP 63-168437 A
Patent Literature 2: JP 2005-139240 A
Patent Literature 3: JP 2003-171424 A

SUMMARY OF INVENTION

Technical Problem

It is an object of the present invention to provide: a modified polyvinyl alcohol and a water-soluble film produced therefrom that have high cold water solubility and are superior in practical properties such as strength and stiffness and that resist deterioration in various properties over time when used to package a chemical, and this object is attained by the employment of a modified PVA that contains a predetermined amount of a monomer unit having two carboxyl groups and for which certain integrals in $^1$H-NMR spectroscopy satisfy a predetermined condition.

Solution to Problem

Through a detailed study aimed at solving the above problems, the present inventors have found that a modified PVA that contains a predetermined amount of a monomer unit having two carboxyl groups and for which certain integrals in $^1$H-NMR spectroscopy satisfy a predetermined condition, and a water-soluble film produced using the PVA, have high cold water solubility, are superior in practical properties such as strength and stiffness, and can resist deterioration in various properties such as chemical resistance over time. Based on this finding, the inventors have completed the present invention.

That is, the present invention relates to the following:

[1] A modified polyvinyl alcohol containing 0.05 to 10 mol % of a monomer unit having two carboxyl groups, wherein in $^1$H-NMR spectroscopy of the modified polyvinyl alcohol, an integral (X) from 6.8 to 7.2 ppm and an integral (Y) from 5.3 to 5.5 ppm satisfy the following expression:

$$0.60 \leq X/(X+Y) < 1.0;$$

[2] The modified polyvinyl alcohol according to [1], wherein the monomer unit having two carboxyl groups is derived from at least one selected from the group consisting of an unsaturated dicarboxylic acid, an unsaturated dicarboxylic acid anhydride, and an unsaturated dicarboxylic acid ester;

[3] The modified polyvinyl alcohol according to [1], wherein the monomer unit having two carboxyl groups is derived from at least one monomer having two carboxyl groups, the at least one monomer being selected from the group consisting of maleic acid, monomethyl maleate, monoethyl maleate, dimethyl maleate, diethyl maleate, maleic anhydride, itaconic acid, monomethyl itaconate, monoethyl itaconate, dimethyl itaconate, and diethyl itaconate;

[4] The modified polyvinyl alcohol according to any one of [1] to [3], containing a structural unit formed from at least an amount of the monomer unit having two carboxyl groups, the structural unit being represented by the following formula (I);

[Chemical Formula 1]

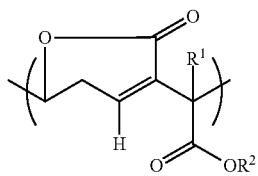

(I)

where $R^1$ represents a hydrogen atom or a linear or branched alkyl group having 1 to 8 carbon atoms, $R^2$ represents a metal atom, a hydrogen atom, or a linear or branched alkyl group having 1 to 8 carbon atoms;

[5] The modified polyvinyl alcohol according to any one of [1] to [4], having a viscosity-average degree of polymerization of 300 to 3000 and a degree of saponification of 82.0 to 99.9 mol %;

[6] A water-soluble film containing the modified polyvinyl alcohol according to any one of [1] to [5];

[7] The water-soluble film according to [6], further containing a plasticizer;

[8] The water-soluble film according to [6] or [7], further containing a surfactant;

[9] A package including a chemical and the water-soluble film according to any one of [6] to [8], the chemical being enclosed by the water-soluble film; and

[10] The package according to [9], wherein the chemical is an agricultural chemical or a detergent.

Advantageous Effects of Invention

The modified PVA of the present invention and the water-soluble film containing the modified PVA have high cold water solubility, are superior in practical properties such as strength and stiffness, and can resist deterioration in various properties such as chemical resistance over time. The water-soluble film of the present invention is thus suitable for use as a packaging material for various chemicals such as agricultural chemicals and laundry detergents.

BRIEF DESCRIPTION OF DRAWING

FIG. 1 shows parts of $^1$H-NMR spectra (solvent: $D_2O$, temperature: 80° C.) measured for the modified PVA according to an embodiment of the present invention and mixtures of different pHs prepared by adding varying amounts of sodium hydroxide (NaOH) to the modified PVA.

DESCRIPTION OF EMBODIMENTS

[Modified PVA]
The modified PVA of the present invention is a modified polyvinyl alcohol containing 0.05 to 10 mol % of a monomer unit having two carboxyl groups. In $^1$H-NMR spectroscopy of the modified polyvinyl alcohol, an integral (X) from 6.8 to 7.2 ppm and an integral (Y) from 5.3 to 5.5 ppm satisfy the following expression.

$$0.60 \leq X/(X+Y) < 1.0$$

Examples of a monomer having two carboxyl groups that can be used as a source of the above monomer unit include: unsaturated dicarboxylic acids such as maleic acid, fumaric acid, citraconic acid, mesaconic acid, and itaconic acid; unsaturated dicarboxylic acid anhydrides such as maleic anhydride and citraconic anhydride; and unsaturated dicarboxylic acid esters. Examples of the unsaturated dicarboxylic acid esters include: monoalkyl esters of unsaturated dicarboxylic acids such as monomethyl maleate, monoethyl maleate, monomethyl fumarate, monoethyl fumarate, monomethyl citraconate, monoethyl citraconate, monomethyl mesaconate, monoethyl mesaconate, monomethyl itaconate, and monoethyl itaconate; and dialkyl esters of unsaturated dicarboxylic acids such as dimethyl maleate, diethyl maleate, dimethyl fumarate, diethyl fumarate, dimethyl citraconate, diethyl citraconate, dimethyl mesaconate, diethyl mesaconate, dimethyl itaconate, and diethyl itaconate. Among these monomers which have two carboxyl groups, maleic acid, monomethyl maleate, dimethyl maleate, maleic anhydride, itaconic acid, monomethyl itaconate, and dimethyl itaconate are preferred in terms of cold water solubility, and particularly preferred are monomethyl maleate and dimethyl maleate. The modified PVA of the present invention has at least one such monomer unit as described above and may have a combination of two or more such monomer units.

The content of the monomer unit having two carboxyl groups is 0.05 to 10 mol %, preferably 0.10 to 8.0 mol %, more preferably 0.15 to 7.0 mol %, and particularly preferably 0.20 to 5.0 mol %. If the content of the monomer unit having two carboxyl groups is less than 0.05 mol %, the cold water solubility will be unsatisfactory. If the content is more than 10 mol %, the practical properties such as strength will be unsatisfactory.

It is preferable for the modified PVA of the present invention to contain a structural unit formed from at least an amount of the monomer unit having two carboxyl groups, the structural unit being represented by the formula (I) below. It is more preferable for the modified PVA to contain a five-membered ring lactone structure formed from at least an amount of the monomer unit and represented by the formula (II) below in addition to the six-membered ring lactone structure represented by the formula (I). When the modified PVA of the present invention contains the lactone ring structure(s) represented by the formula (I) and/or formula (II), the molecular chains of the PVA are so rigid as to lead to a further improvement in practical properties such as, in particular, the strength and stiffness of the film. The lactone ring structure(s) as represented by the formula (I) and/or the formula (II) are formed by a reaction between hydroxy groups and carboxyl groups, the hydroxy groups being derived from a vinyl alcohol unit resulting from saponification of a vinyl ester unit, the carboxyl groups being derived from the monomer unit having two carboxyl groups.

[Chemical Formula 2]

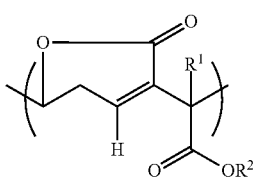
(I)

[Chemical Formula 3]

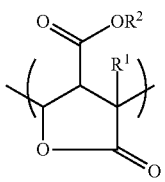
(II)

In the formulae (I) and (II), $R^1$ represents a hydrogen atom or a linear or branched alkyl group having 1 to 8 carbon atoms, $R^2$ represents a metal atom, a hydrogen atom, or a linear or branched alkyl group having 1 to 8 carbon atoms. Examples of the linear or branched alkyl group having 1 to 8 carbon atoms which is represented by $R^1$ or $R^2$ include methyl, ethyl, propyl, isopropyl, butyl, pentyl, hexyl, heptyl, and octyl groups. Examples of the metal atom represented by $R^2$ include sodium, calcium, potassium, and lithium atoms. In particular, in terms of, for example, ease of synthesis, it is preferable for $R^1$ to be a hydrogen atom or methyl group and for $R^2$ to be a sodium atom, methyl group, or hydrogen atom. The structural unit represented by the formula (I) is particularly preferably a structural unit represented by the following formula (I-1).

[Chemical Formula 4]

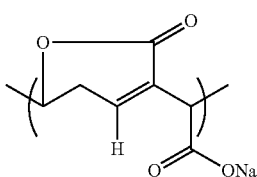
(I)

The total content of the structural units represented by the formulae (I) and (II) (or the content of the structural unit represented by the formula (I) for the case where the PVA does not contain any structural unit represented by the formula (II)) is not particularly limited, and is 0.05 mol % or more and less than 10 mol %, preferably 0.08 to 8.0 mol %, more preferably 0.10 to 7.0 mol %, and particularly preferably 0.15 to 5.0 mol %. When the total content of the structural units represented by the formulae (I) and (II) is in the above range, the practical properties such as strength, and the cold water solubility, of the resulting film can be further improved. The content of the structural unit(s), as defined herein, refers to the ratio of the number of moles of lactone rings to the total number of moles of monomer units forming the main chain of the modified PVA.

It is particularly important that in $^1$H-NMR spectroscopy of the modified PVA of the present invention, an integral (X) from 6.8 to 7.2 ppm and an integral (Y) from 5.3 to 5.5 ppm satisfy the following expression.

$$0.60 \le X/(X+Y) < 1.0$$

Specifically, the $^1$H-NMR measurement of the modified PVA can be done by dissolving the modified PVA in $D_2O$ and subjecting the resulting solution to $^1$H-NMR at 600 MHz at 80° C. The $^1$H-NMR measurement of the modified PVA in the present invention does not require pH adjustment. The following will describe the change in NMR spectrum caused by structural change with reference to examples where the NMR measurement was performed at varying pHs. The spectrum 1 shown in FIG. 1 is a part of the $^1$H-NMR spectrum of a monomethyl maleate-modified PVA obtained in Example 1 described later (pH=6). The spectrum 2 is a part of the $^1$H-NMR spectrum of a mixture (solution) prepared by adding, to the solution for which the above spectrum 1 was observed, sodium hydroxide (NaOH) in an amount to give a pH of 9. The spectrum 3 is a part of the $^1$H-NMR spectrum of a mixture (solution) prepared by adding NaOH in an amount to give a pH of 11, and the spectrum 4 is a part of the $^1$H-NMR spectrum of a mixture (solution) prepared by adding a considerably large amount of NaOH.

For example, the monomethyl maleate-modified PVA produced in Example 1 described later contains a structural unit (lactone ring unit) represented by the formula (I-1) below and, when this PVA is subjected to $^1$H-NMR measurement, a peak attributed to the hydrogen atom bonded to the carbon atom involved in the carbon-carbon double bond in the lactone ring is detected in the range of 6.8 to 7.2 ppm as illustrated by the spectrum 1 of FIG. 1. In the spectrum 1, two peaks are seen between 6.8 and 7.2 ppm. These peaks are considered to be derived from isomers of the structural unit represented by the formula (I-1).

[Chemical Formula 5]

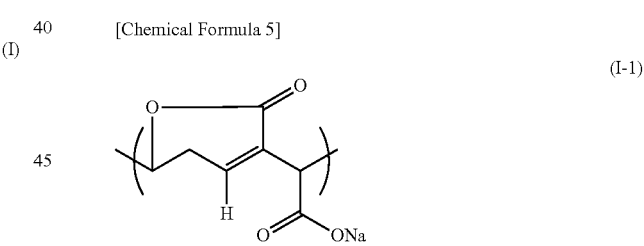
(I-1)

Adding sodium hydroxide (NaOH) to the solution having the spectrum 1 induces hydrolysis leading to ring opening of the lactone ring moiety of the structural unit represented by the formula (I-1), resulting in the formation of a structural unit represented by the formula (I-1') below. The peak attributed to a hydrogen atom (the hydrogen atom bonded to the carbon atom involved in the main-chain carbon-carbon double bond and included in the lactone ring), which is detected in the range of 6.8 to 7.2 ppm for the structural unit represented by the formula (I-1), shifts to the range of 5.3 to 5.5 ppm due to ring opening resulting in the structural unit represented by the formula (I-1'). As seen from FIG. 1, increasing the pH by the addition of sodium hydroxide to the solution having the spectrum 1 decreases the intensity of the peak at 6.8 to 7.2 ppm and at the same time increases the intensity of the peak at 5.3 to 5.5 ppm (see the spectra 2 to 4 in FIG. 1).

[Chemical Formula 6]

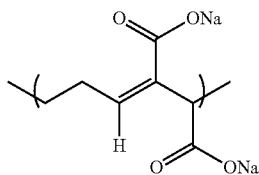

(I-1')

That is, if, in $^1$H-NMR spectroscopy, the integral (X) from 6.8 to 7.2 ppm and the integral (Y) from 5.3 to 5.5 ppm satisfy the expression given below, then this technically means that the degree of lactone ring formation, which is a measure indicating how much the lactone ring unit as represented by the formula (I-1) is present in the molecule of the modified PVA of the present invention, falls within a predetermined range as defined later.

$$0.60 \leq X/(X+Y) < 1.0$$

In order that the integral (X) from 6.8 to 7.2 ppm and the integral (Y) from 5.3 to 5.5 ppm in $^1$H-NMR spectroscopy of the modified PVA of the present invention may satisfy the above expression, the following techniques can be used, for example: 1) adjustment of the water content in saponification; 2) adjustment of the temperature and time of drying process; and 3) treatment of the modified PVA under a different pH condition. These techniques may be employed alone or in combination with one another.

It is important that the value of X/(X+Y) be 0.60 or more and less than 1.0. The value of X/(X+Y) is preferably 0.65 to 0.98, more preferably 0.70 to 0.95, and even more preferably 0.75 to 0.90. If the value of X/(X+Y) is less than 0.60, the practical properties such as the strength and stiffness of the resulting film will be unsatisfactory. If the value of of X/(X+Y) is 1.0 or more, the cold water solubility will be unsatisfactory.

The degree of polymerization (viscosity-average degree of polymerization) of the modified PVA employed in the present invention is not particularly limited, and is preferably 300 to 3000, more preferably 400 to 2500, and particularly preferably 500 to 2000 in terms of the water solubility of the resulting film. When the viscosity-average degree of polymerization of the modified PVA is in the above range, the film has a further improved strength and solubility and, in addition, a film formation material used for forming the film can have a suitable solution viscosity or melt viscosity, resulting in high workability. The viscosity-average degree of polymerization P of the modified PVA is measured by the method according to JIS K 6726 (1994). That is, the modified PVA is further saponified and purified, after which its limiting viscosity [η] (liter/g) is measured in 30° C. water and then the viscosity-average degree of polymerization P is determined from the limiting viscosity using the following equation.

$$P=([\eta] \times 10000/8.29)^{(1/0.62)}$$

The degree of saponification of the modified PVA employed in the present invention is not particularly limited. In terms of preventing the resulting film from experiencing a decrease in water solubility when a package produced by packaging an alkaline substance or acidic substance in the film is in storage, the degree of saponification of the modified PVA is preferably 82.0 to 99.9 mol %, more preferably 84.0 to 99.8 mol %, and even more preferably 86.0 to 98.6 mol %. The degree of saponification of the modified PVA is measured by the method according to JIS K 6726 (1994).

[Method for Producing Modified PVA]

A method for producing the modified PVA of the present invention will now be described in detail. The present invention is not limited to the embodiment described hereinafter.

The modified PVA of the present invention can be produced as follows, for example: a vinyl ester copolymer obtained by copolymerization of a vinyl ester monomer and a monomer having two carboxyl groups is saponified in an alcohol solution with the aid of an alkali or acid catalyst. The lactone ring-containing structural unit(s) represented by the formula (I) and/or formula (II) are formed by a reaction between hydroxy groups derived from the vinyl alcohol unit resulting from saponification of the vinyl ester unit and carboxyl groups derived from the monomer unit having two carboxyl groups (this reaction may hereinafter be referred to as "lactonization").

Examples of the vinyl ester monomer include vinyl formate, vinyl acetate, vinyl propionate, vinyl valerate, vinyl caprate, vinyl laurate, vinyl stearate, vinyl benzoate, vinyl pivalate, and vinyl versatate. Particularly preferred is vinyl acetate.

Examples of the method for copolymerization of the vinyl ester monomer and the monomer having two carboxyl groups include known methods such as bulk polymerization process, solution polymerization process, suspension polymerization process, and emulsion polymerization process. Among such processes, bulk polymerization process without the use of any solvent or solution polymerization process with the use of a solvent such as an alcohol is generally used. In terms of enhancing the effects of the present invention, it is preferable to employ solution polymerization process in which polymerization is allowed to take place in the presence of a lower alcohol. The lower alcohol is not particularly limited. Alcohols having three or less carbon atoms, such as methanol, ethanol, propanol, and isopropanol, are preferred, and methanol is suitably used. When the polymerization reaction is carried out by bulk polymerization process or solution polymerization process, the reaction mode may be of the batch type or continuous type.

A known initiator can be used for the polymerization reaction as long as the initiator does not impair the effects of the present invention. Examples of the polymerization initiator include: azo initiators such as 2,2'-azobisisobutyronitrile, 2,2'-azobis(2,4-dimethyl-valeronitrile), and 2,2'-azobis (4-methoxy-2,4-dimethylvaleronitrile); and organic peroxide initiators such as benzoyl peroxide and n-propyl peroxycarbonate. The polymerization temperature at which the polymerization reaction is carried out is not particularly limited, and is suitably in the range of 5 to 200° C.

When the vinyl ester monomer and the monomer having two carboxyl groups are copolymerized, another copolymerizable monomer may, as appropriate, be allowed to participate in the copolymerization, as long as the other copolymerizable monomer does not impair the effects of the present invention. Examples of the monomer other than the vinyl ester monomer and the monomer having two carboxyl groups include: α-olefins such as ethylene, propylene, 1-butene, isobutene, and 1-hexene; acrylamide; acrylamide derivatives such as N-methylacrylamide and N-ethylacrylamide; methacrylamide; methacrylamide derivatives such as N-methylmethacrylamide and N-ethylmethacrylamide; vinyl ethers such as methyl vinyl ether, ethyl vinyl ether, n-propyl vinyl ether, isopropyl vinyl ether, and n-butyl vinyl ether; hydroxy-containing vinyl ethers such as ethylene glycol vinyl ether, 1,3-propanediol vinyl ether, and 1,4-butanediol vinyl ether; allyl ethers such as propyl allyl ether, butyl allyl ether, and hexyl allyl ether; oxyalkylene-containing monomers; hydroxy-containing α-olefins such as isopropenyl acetate, 3-buten-1-ol, 4-penten-1-ol, 5-hexen-1-ol, 7-octen-1-ol, 9-decen-1-ol, and 3-methyl-3-buten-1-ol; silyl-containing monomers such as vinyltrimethoxysilane, vinylmethyldimethoxysilane, vinyldimethylmethoxysilane, vinyltriethoxysilane, vinylmethyldiethoxysilane, vinyklimethylethoxysilane, 3-(meth)acrylamidopropyltrimethoxysilane, and 3-(meth)acrylamidopropyltriethoxysilane; and N-vinylamide monomers such as N-vinylformamide, N-vinylacetamide, N-vinyl-2-pyrrolidone, and N-vinyl-2-caprolactam. The amount of such a monomer to be used depends on the intended purpose or application, and is typically 20 mol % or less and preferably 10 mol % or less, with respect to 100 mol % of the total monomers used in copolymerization.

The vinyl ester copolymer obtained by the above method is saponified in an alcohol solvent, and the saponification is followed by drying to obtain the modified PVA. To obtain the modified PVA of the present invention, it is preferable that the water content of a saponification starting solution to be subjected to saponification, the temperature of the PVA resin during drying, or the drying time is in the predetermined range as described below. It is more preferable that the water content of the saponification starting solution and the temperature of the PVA resin during drying is in the predetermined ranges as described below, and it is particularly preferable that the water content of the saponification starting solution, the temperature of the PVA resin during drying, and the drying time is in the predetermined ranges as described below.

To the solution containing the vinyl ester copolymer and the solvent, which is obtained as a result of the above copolymerization process, there is further added a small amount of water. The saponification starting solution can thus be prepared. The amount of the water added is preferably adjusted so that the water content of the resulting saponification starting solution is more than 1.0 mass % and less than 2.0 mass %. The water content is more preferably 1.2 to 1.8 mass %. If the water content is 1.0 mass % or less, lactonization (lactone ring formation) readily takes place, so that the content of the structural unit(s) represented by the formula (I) and/or the formula (II) is likely to be excessively high. If the water content is 2.0 mass % or more, the ring opening of the lactone structure readily takes place, so that the structural unit(s) represented by the formula (I) and/or the formula (II) may not be formed. It is therefore important to adjust the water content to the above range in order to control the degree of lactone ring formation resulting from the saponification reaction so that, in $^1$H-NMR spectroscopy of the resulting modified PVA, the integral (X) from 6.8 to 7.2 ppm and the integral (Y) from 5.3 to 5.5 ppm satisfy the expression given above.

Examples of the solvent that can be used for the saponification reaction include methanol, methyl acetate, dimethylsulfoxide, diethylsulfoxide, and dimethylformamide. Among these solvents, methanol is preferably used.

The catalyst used for the saponification reaction of the vinyl ester copolymer is typically an alkaline substance, examples of which include: alkali metal hydroxides such as potassium hydroxide and sodium hydroxide; and alkali metal alkoxides such as sodium methoxide. Examples of acid catalysts include hydrochloric acid, sulfuric acid, and nitric acid. The amount of the saponification catalyst used, as expressed by a molar ratio relative to the vinyl ester monomer unit of the vinyl ester copolymer, is preferably 0.002 to 0.50, more preferably 0.003 to 0.30, and particularly preferably 0.004 to 0.10. The whole amount of the saponification catalyst may be added at the beginning of the saponification reaction. Alternatively, a portion of the catalyst may be added at the beginning of the saponification reaction, and the rest of the catalyst may be subsequently added in the course of the saponification reaction.

The saponification reaction is carried out preferably at 5 to 80° C., more preferably at 20 to 70° C. The saponification reaction is carried out preferably for 5 minutes to 10 hours, more preferably for 10 minutes to 5 hours. The saponification reaction may be carried out either in a batch manner or in a continuous manner. After the saponification reaction, the remaining catalyst may be neutralized as appropriate. Examples of usable neutralizers include organic acids such as acetic acid and lactic acid and ester compounds such as methyl acetate.

After the saponification and neutralization, a step of cleaning the modified PVA may be performed as appropriate. As the cleaning liquid there can be used a solution containing a lower alcohol such as methanol as a main component and further containing water and/or an ester such as methyl acetate which is formed in the saponification process.

Drying is finally performed and consequently the modified PVA of the present invention can be obtained. Specifically, hot air drying using a cylindrical dryer is preferred, and the temperature of the modified PVA resin during drying is preferably higher than 100° C. and lower than 120° C. and more preferably 105 to 115° C. The drying time is preferably 2 to 5 hours and more preferably 3 to 5 hours. The reason why the drying conditions preferably fall within the above ranges is that in this case, when the finally-obtained modified PVA is subjected to $^1$H-NMR spectroscopy, the integral (X) from 6.8 to 7.2 ppm and the integral (Y) from 5.3 to 5.5 ppm can satisfy the expression given above.

[Water-Soluble Film]

A water-soluble film containing the modified PVA is an embodiment of the present invention.

In general, water-soluble films need to have such high strength or toughness that they can be used in hot and humid regions or in cold regions. In particular, impact resistance at low temperatures is required of water-soluble films. Into the water-soluble film of the present invention there can be incorporated any of various plasticizers for the purpose of decreasing the glass-transition point of the film and thus improving the impact resistance of the film at low temperatures. Furthermore, a plasticizer can be incorporated into the water-soluble film of the present invention not only for the above purpose but also for the purpose of increasing the solubility of the film in water.

The plasticizer that can be incorporated into the water-soluble film of the present invention is not particularly limited and may be any of commonly used plasticizers for PVAs. Examples of the plasticizer include: polyols such as glycerin, diglycerin, diethylene glycol, triethylene glycol, propylene glycol, dipropylene glycol, trimethylolpropane, pentaerythritol, and 1,3-butanediol; polyethers such as polyethylene glycol and polypropylene glycol; polyvinylamides such as polyvinylpyrrolidone; amide compounds such as N-methylpyrrolidone and dimethylacetamide; compounds resulting from addition of ethylene oxide to polyols such as glycerin, pentaerythritol, and sorbitol; and water. These plasticizers can be used alone or in combination with one another. Among these plasticizers, glycerin, diglycerin diethylene glycol, triethylene glycol, propylene glycol, dipropylene glycol, trimethylolpropane, polyethylene glycol, or polyvinylpyrrolidone can be preferably used for the purpose of increasing the water solubility. In terms of preventing a decrease in water solubility of the film caused by bleed-out of the plasticizer, it is particularly preferable to use glycerin, diglycerin, trimethylolpropane, polyethylene glycol, or polyvinylpyrrolidone.

When polyethylene glycol is used as the plasticizer, the molecular weight of the polyethylene glycol is not particularly limited. In terms of the compatibility with the modified PVA and in terms of the prevention of a decrease in water solubility caused by bleed-out, it is preferable for the polyethylene glycol to have a number average molecular weight of 100 to 1000. When polyvinylpyrrolidone is used, its molecular weight is not particularly limited either. In terms of the compatibility with the PVA, it is preferable for the polyvinylpyrrolidone to have a weight average molecular weight of 1000 to 20000.

The amount of the plasticizer incorporated is preferably 1 to 50 parts by mass relative to 100 parts by mass of the modified PVA. If the amount of the plasticizer incorporated is less than 1 part by mass, the incorporation of the plasticizer may fail to provide the desired effect. If the amount of the plasticizer incorporated is more than 50 parts by mass, bleed-out of the plasticizer may become so severe that the anti-blocking properties of the resulting film may deteriorate. In terms of the rate of dissolution in water of the resulting film, it is preferable to incorporate the plasticizer in an amount of 20 parts by mass or more relative to 100 parts by mass of the modified PVA. In terms of the stiffness (processability in bag making machines etc.) of the resulting film, it is preferable to incorporate the plasticizer in an amount of 40 parts by mass or less relative to 100 parts by mass of the modified PVA.

To improve the water solubility of the resulting film, it is preferable to increase the amount of the plasticizer incorporated. In addition, the larger the amount of the plasticizer incorporated is, the lower the required heat sealing temperature tends to be. However, an increase in the amount of the plasticizer incorporated tends to lead to low stiffness of the film and hence poor processability in bag making machines etc. It is therefore desirable that the original film to which the plasticizer is to be added has high stiffness. The stiffness of films can be evaluated on the basis of Young's modulus. That is, the higher the Young's modulus of a film is, the higher the stiffness of the film is.

The amount of the plasticizer incorporated has a relatively large influence on the strength or Young's modulus of the resulting film. In terms of the utility of the resulting film, the tensile strength of the film is preferably 2.0 kg/cm$^2$ or more, more preferably 2.5 kg/cm$^2$ or more, and even more preferably 3.0 kg/cm$^2$ or more. The conditions and method for measuring the tensile strength are as described in Examples later. In terms of the processability of the resulting film in bag making machines etc., the Young's modulus of the film is preferably 1.5 kg/mm$^2$ or more, more preferably 2.0 kg/mm$^2$ or more, even more preferably 2.5 kg/mm$^2$ or more, and still even more preferably 3.0 kg/mm$^2$ or more. The conditions and method for measuring the Young's modulus are as described in Examples later. It is preferable to incorporate a plasticizer into the water-soluble film of the present invention to the extent that the Young's modulus of the film is in the above range.

A surfactant can be incorporated into the water-soluble film of the present invention as appropriate. The type of the surfactant is not particularly limited, and preferred is an anionic or nonionic surfactant. Preferred examples of the anionic surfactant include: carboxylic acid anionic surfactants such as potassium laurate; sulfate anionic surfactants such as octyl sulfate; and sulfonic acid anionic surfactants such as dodecylbenzene sulfonate. Preferred examples of the nonionic surfactant include: alkyl ether nonionic surfactants such as polyoxyethylene lauryl ether and polyoxyethylene oleyl ether; alkyl phenyl ether nonionic surfactants such as polyoxyethylene octyl phenyl ether; alkyl ester nonionic surfactants such as polyoxyethylene laurate; alkylamine nonionic surfactants such as polyoxyethylene lauryl amino ether; alkylamide nonionic surfactants such as polyoxyethylene lauric acid amide; polypropylene glycol ether nonionic surfactants such as polyoxyethylene polyoxypropylene ether; alkanolamide nonionic surfactants such as oleic acid diethanolamide; and allyl phenyl ether nonionic surfactants such as polyoxyalkylene allyl phenyl ether. These surfactants may be used alone or in combination with one another.

The amount of the surfactant incorporated is 0.01 to 2 parts by mass, preferably 0.1 to 1 parts by mass, and more preferably 0.2 to 0.5 parts by mass relative to 100 parts by mass of the PVA. It is not preferable that the amount of the surfactant incorporated is less than 0.01 parts by mass, because in this case, the ease of separation of the formed film from the metal surface of a drum or the like of a film formation device decreases so that the film production becomes difficult. It is not preferable that the amount of the surfactant incorporated is more than 2 parts by mass, because in this case, the surfactant leaches out of the surface of the film and acts to cause blocking, leading to deterioration in handling properties of the film.

A carbohydrate can be incorporated into the water-soluble film of the present invention as appropriate. Examples of the carbohydrate include monosaccharides, oligosaccharides, polysaccharides, and chain sugar alcohols. Examples of the monosaccharides include glucose. Examples of the oligosaccharides include galactooligosaccharide, isomaltooligosaccharide, xylooligosaccharide, soybean oligosaccharide, nigerooligosaccharide, lactosucrose, and fructooligosaccharide. Examples of the polysaccharides include starches, cellulose, chitin, chitosan, hemicellulose, pectin, pullulan, agar, alginic acid, carrageenan, dextrin, and trehalose. Examples of the chain sugar alcohol include: tetrols such as threitol and erythritol which have four carbon atoms; pentols such as arabitol and xylitol which have five carbon atoms; and hexols such as glycitol, mannitol, and sorbitol which have six carbon atoms. One or more of the above carbohydrates can be used. The addition of a carbohydrate provides a further increase in water solubility and biodegradability of the film and an increase in borate ion tolerance of the film and also prevents the film from experiencing a decrease in cold water solubility after packaging a chemical, in particular a chemical that degrades PVAs (such as chlorine-containing substances). Among the carbohydrates, a starch is preferably incorporated into the film in terms of obtaining good improving effect on the cold water solubility of the film by the addition of the carbohydrate. Examples of usable starches include: raw starches from corn and potato; and processed starches (such as dextrin, oxidized starches, etherified starches, and cationized starches) derived by physical or chemical process of the raw starches.

The amount of the carbohydrate incorporated is preferably 1 to 100 parts by mass, more preferably 2 to 90 parts by mass, and particularly preferably 3 to 80 parts by mass relative to 100 parts by mass of the modified PVA. In general, PVAs are poorly compatible with carbohydrates, and thus incorporation of a large amount of carbohydrate into a PVA leads to a considerable deterioration in the mechanical properties such as strength of the resulting film. By contrast, the modified PVA used in the water-soluble film of the present invention features high compatibility with carbohydrates, in particular starches, and thus allows the incorporation of a large amount of carbohydrate into the water-soluble film of the present invention. If the amount of the carbohydrate incorporated is less than 1 part by mass, the carbohydrate may fail to provide the effect of improving the water solubility and biodegradability of the film. If the amount of the carbohydrate incorporated is more than 100 parts by mass, this will lead to a decrease in impact resistance of the film at low temperatures and hence an increase in the possibility of package breaking.

Furthermore, an inorganic filler can be incorporated into the water-soluble film of the present invention as appropriate. Examples of the inorganic filler used for the water-soluble film of the present invention include: silica; heavy, light, or surface-treated calcium carbonate; aluminum hydroxide; aluminum oxide; titanium oxide; diatomite; barium sulfate; calcium sulfate; zeolite; zinc oxide; silicic acid; silicate; mica; magnesium carbonate; clays such as kaolin, halloysite, pyrophyllite, and sericite; and talc. One or more of these can be used. Among these, talc is preferably used, particularly in terms of the dispersibility in the modified PVA. The average particle diameter of the inorganic filler is preferably 1 μm or more in terms of the anti-blocking properties of the film, and is preferably 10 μm or less in terms of the dispersibility in the modified PVA. To meet the performance requirements as to both the anti-blocking properties of the film, which are obtained by the inorganic filler incorporation, and the dispersibility of the inorganic filler in the modified PVA, the inorganic filler used is more preferably one having an average particle diameter of about 1 to 7 μm.

In terms of the anti-blocking properties of the film and the dispersibility of the inorganic filler in the modified PVA, the amount of the inorganic filler incorporated is preferably 0.5 to 20 parts by mass, more preferably 0.7 to 15 parts by mass, and particularly preferably 1 to 10 parts by mass, relative to 100 parts by mass of the modified PVA. If the inorganic filler is incorporated in an amount of more than 20 parts by mass, the inorganic filler particles will be likely to be poorly dispersed and thus aggregated in the modified PVA, with the result that the water solubility of the resulting film will tend to decrease.

Furthermore, an additive such as a colorant, flavor, extender, antifoaming agent, release agent, or ultraviolet absorber may optionally be incorporated into the water-soluble film of the present invention as appropriate. In particular, in order to improve the ease of separation of the formed film from the metal surface of a die, drum, or the like of a film formation device, it is preferable to incorporate a surfactant in an amount of 0.01 to 5 parts by mass relative to 100 parts by mass of the modified PVA. Still furthermore, another water-soluble polymer such as a PVA different from the modified PVA of the present invention, carboxymethylcellulose, polyacrylamide, polyacrylic acid, polyacrylic acid salt, methylcellulose, or hydroxymethylcellulose, may be incorporated into the water-soluble film of the present invention as appropriate, as long as the water-soluble polymer does not impair the effects of the present invention. In particular, it is preferable to add low-viscosity carboxymethylcellulose in terms of improving the water solubility of the film.

The raw material for production of the water-soluble film of the present invention can be prepared by adding components such as a plasticizer, carbohydrate, and inorganic filler to the modified PVA as appropriate and then mixing the modified PVA and the components using a known technique such as a technique employing a stirring chamber in which the PVA and the components are dissolved or dispersed in a solvent or a technique employing an extruder in which the PVA and the components are melted and kneaded.

The method for producing the water-soluble film of the present invention is not particularly limited, and the production can be accomplished by a known technique such as casting or melt extrusion. For example, the PVA resin, the plasticizer, and, if desired, various additives described above (such as a surfactant and a carbohydrate) are dissolved in an aqueous solvent (such as water), the resulting solution is allowed to stand on a smooth casting surface until completion of evaporation of the aqueous solvent, and then the resulting film is separated from the casting surface. The thus obtained water-soluble film of the present invention is transparent and uniform. The aqueous solvent is preferably water. The casting surface may be any smooth, hard casting surface formed of a material such as steel, aluminum, glass, or polymer (such as polyolefin, polyethylene, polyamide, polyvinyl chloride, polycarbonate, or polyhalocarbon). The rate of evaporation of the aqueous solvent can be increased by heating the casting surface or by exposing the deposited solution, for example, to heated air or to infrared rays. The casting surface may be flat. Alternatively, the film may be obtained by film formation using a standard (drum-type) industrial casting machine for film production and by the subsequent oven drying.

The thickness of the water-soluble film of the present invention is preferably 10 to 200 μm. In terms of the balance between the strength and water solubility of the film, the thickness is more preferably 20 to 150 μm and particularly preferably 30 to 120 μm.

To improve the anti-blocking properties of the water-soluble film of the present invention, the water-soluble film may, as appropriate, be provided with a roll mat-like surface morphology (pitted surface), be coated with an anti-blocking powder made of silica or starch, or be embossed. The formation of a roll mat-like morphology in the surface of the film can be achieved by providing minute peaks and valleys on the roll with which a wet film contacts during the film formation. The embossing can be typically carried out by, after forming the film, nipping the film between an embossing roll and a rubber roll while applying heat or pressure. The powder coating cannot be employed depending on the intended application of the film, although the powder coating provides a great anti-blocking effect. Thus, the blocking prevention is preferably accomplished by the roll mat-like surface morphology formation or by the embossing. The roll mat-like surface morphology formation is particularly preferred in terms of the level of the anti-blocking effect.

The water-soluble film of the present invention has a surface appearance suitable for use as a packaging material, has excellent cold water solubility and mechanical strength, and can resist deterioration in various properties such as chemical resistance over time. The water-soluble film is therefore useful in various fields such as the fields of chemical packaging materials and hygiene materials. The chemical to be packaged is not particularly limited, and examples include detergents for clothes, bleaches, and agricultural chemicals (such as Bordeaux mixture, the active ingredient of which is basic copper sulfate). The form of the chemical is not particularly limited, and the chemical may be a liquid or a solid (such as a powder, granule, or block).

The present invention encompasses embodiments obtainable by combining the above features in various ways within the technical scope of the present invention, as long as the embodiments provide the effects of the present invention.

EXAMPLES

Hereinafter, the present invention will be described in more detail with reference to examples. It should be noted that the present invention is not limited in any respect by the examples given below, and many modifications are possible by ordinarily skilled person in the art within the technical concept of the present invention. In Examples and Comparative Examples given below, the terms "part(s)" and "%" refer to "part(s) by mass" and "mass %", respectively, unless otherwise specified. The term "degree of polymerization" refers to "viscosity-average degree of polymerization".

[Degree of Polymerization and Degree of Saponification of Modified PVA]

The degree of polymerization and degree of saponification of the modified PVA were determined by the method according to JIS K 6726 (1994).

[$^1$H-NMR Spectroscopy]

The $^1$H-NMR measurement of the modified PVA was carried out by dissolving the modified PVA in $D_2O$ and subjecting the resulting solution to $^1$H-NMR at 600 MHz at 80° C.

[Method for Measuring Water Solubility of Film]

Each of the films obtained in Examples and Comparative Examples was cut into a 40 mm×40 mm square piece, which was inserted in a slide mount. Besides, a 1 liter glass beaker containing 1 liter of distilled water was placed in a thermostat bath adjusted to 10° C., and the distilled water was stirred using a 5-cm rotor at 250 rpm. After the temperature of the distilled water in the beaker reached 10° C., the slide mount was immersed in the cold water under stirring to start the water solubility measurement. In this measurement, the process of the dissolution of the film was observed, and the time (seconds) to complete dissolution of the film was measured. A rating of "Good" was given when the time to complete dissolution of the film was less than 40 seconds, while when the time to complete dissolution of the film was 40 seconds or more, a rating of "Poor" was given.

[Method for Measuring Young's Modulus and Strength (Practical Properties)]

Each of the films obtained in Examples and Comparative Examples was cut into a 10-mm-wide piece, which was subjected to moisture conditioning at 20° C. and 65% RH for 1 week and then subjected to a tensile test using Autograph. The chuck-to-chuck distance was 50 mm, and the tensile speed was 500 mm/min. A rating of "Good" was given when the Young's modulus was 2.0 kg/mm$^2$ or more and the tensile strength was 2.0 kg/cm$^2$ or more, while when the Young's modulus was less than 2.0 kg/mm$^2$ or the tensile strength was less than 2.0 kg/cm$^2$, a rating of "Poor" was given.

[Method for Evaluating Chemical Resistance (Evaluation of Deterioration in Properties Over Time)]

Each of the films obtained in Examples and Comparative Examples was used to prepare two 10×15 cm rectangular samples. Next, these samples of the film were placed on top of each other, and their three sides were heat-sealed using a heat sealer at 140° C. Subsequently, 40 g of a chemical, in particular a mixture of Bordeaux mixture and diatomite (at a mass ratio of 1:3), was put into the resulting packaging bag through its opening. The remaining side was then heat-sealed using a heat sealer at 140° C. to hermetically seal the mixture in the bag. The packaging bag was wrapped by a film formed by laminating polyethylene to aluminum, and the four sides of the wrapping film were heat-sealed using a heat sealer to achieve double packaging that would prevent water and a plasticizer from scattering out of the packaging bag hermetically enclosing the chemical. This bag was subjected to an acceleration test for examining long-term storability. In this test, the bag was left in a thermostat set at 40° C. for 4 weeks and then taken out of the thermostat, after which the water solubility of the packaging film was measured by the method as described above, and the change in water solubility over time was examined by comparison with the water solubility measured before packaging of the chemical. A rating of "Good" was given when the difference in the time to complete dissolution of the film before and after the acceleration test was less than 5 seconds, while when the difference was 5 seconds or more, a rating of "Poor" was given.

Example 1

Synthesis of PVA-1

There were used: a polymerization vessel (continuous polymerization apparatus) equipped with a reflux condenser, a material feed line, a thermometer, a nitrogen introduction port, and a stirring blade; and an apparatus equipped with a reflux condenser, a material feed line, a reaction solution collection line, a thermometer, a nitrogen introduction port, and a stirring blade. Vinyl acetate (VAM) (656 L/H), methanol (MeOH) (171 L/H), a 20% methanol solution (101 L/H) of monomethyl maleate (MMM) as a modifier, and a 2% methanol solution (25 L/H) of 2,2'-azobis(4-methoxy-2,4-dimethylvaleronitrile) (AMV) as an initiator were continuously fed to the polymerization vessel using a metering pump. The polymerization solution was continuously collected from the polymerization vessel in such a manner that the liquid level in the polymerization vessel was kept constant. The rate of vinyl acetate polymerization in the polymerization solution collected from the polymerization vessel was controlled to 40%. The residence time in the polymerization vessel was 4 hours. The temperature of the polymerization solution collected from the polymerization chamber was 63° C. Methanol vapor was introduced into the polymerization solution collected from the polymerization vessel to remove vinyl acetate remaining unreacted. A methanol solution (concentration: 35%) of polyvinyl acetate (PVAc) was thus obtained.

To the methanol solution of polyvinyl acetate were added appropriate amounts of water and methanol, and thus a polyvinyl acetate (PVAc)/methanol solution (concentration: 32 mass %) having a water content of 1.3 mass % was prepared as a saponification starting solution. A sodium hydroxide/methanol solution (concentration: 4 mass %) as a saponification catalyst solution was added in an amount to give a molar ratio of sodium hydroxide of 0.10 relative to the vinyl acetate unit of the PVAc. The saponification starting solution and the saponification catalyst solution were mixed using a static mixer. The resulting mixture was placed on a belt and left at a temperature of 40° C. for 18 minutes to allow the saponification reaction to proceed. The gel resulting from the saponification reaction was ground and dried. The resulting polyvinyl alcohol powder was continuously fed at a rate of 600 kg/hr (resin content) to a dryer with the jacket temperature set at 105° C. The average time of residence of the powder in the dryer was 4 hours. This was followed by grinding to obtain a modified PVA (PVA-1). For the resulting PVA-1, the viscosity-average degree of polymerization was 1200, the degree of saponification was 96.0 mol %, the content of the monomer unit having two carboxyl groups was 4.0 mol %, and the value of X/(X+Y) calculated using an integral (X) from 6.8 to 7.2 ppm and an integral (Y) from 5.3 to 5.5 ppm in $^1$H-NMR spectroscopy was 0.88.

To 100 parts by mass of the modified PVA (PVA-1) listed in Table 1A were added 15 parts by mass of glycerin as a plasticizer, 0.2 parts by mass of polyoxyethylene lauryl ether as a surfactant, and water, and thus a 5% homogeneous aqueous solution (water content: 95%) was prepared. The aqueous solution was casted onto a polyester film and dried at room temperature. The dried product was then separated from the polyester film to obtain a 50-μm film. The film thus obtained was heat-treated at 100° C. for 10 minutes.

The solubility, chemical resistance, and practical properties of the resulting water-soluble film were evaluated by the methods as described above. The evaluation results are shown in Table 2.

Examples 2 to 9 and Comparative Examples 1 to 4

Synthesis of PVA-2 to PVA-13

PVAs (PVA-2 to PVA-13) were obtained in the same manner as PVA-1, except for varying the conditions as shown in Table 1. When PVA-2 to PVA-9 and PVA-11 to PVA-13 were subjected to $^1$H-NMR spectroscopy, peaks were detected at 6.8 to 7.2 ppm and at 5.3 to 5.5 ppm.

Water-soluble films were fabricated in the same manner as in Example 1, except for using the different PVAs listed in Table 2. The solubility, chemical resistance, and practical properties of the resulting water-soluble films were evaluated in the same manner as in Example 1. The evaluation results are shown in Table 2.

TABLE 1

| | Polymerization chamber | | | | | Residence time (h) | Saponification | | | Drying | |
|---|---|---|---|---|---|---|---|---|---|---|---|
| | VAM (L/H) | MeOH (L/H) | AMV (L/H) | Modifier Type | Rate of polymerization (L/H) | | PVAc (mass %) | Water content in reaction system (mass %) | NaOH (molar ratio) | Resin temperature | Average residence time |
| PVA-1 | 656 | 171 | 25 | MMM | 101 | 40 | 4 | 32 | 1.3 | 0.10 | 105 | 4 |
| PVA-2 | 875 | 182 | 12 | MMM | 53 | 30 | 4 | 30 | 1.3 | 0.04 | 105 | 4 |
| PVA-3 | 656 | 171 | 25 | MMM | 101 | 40 | 4 | 32 | 1.4 | 0.50 | 105 | 4 |
| PVA-4 | 656 | 171 | 25 | MMM | 101 | 40 | 4 | 30 | 1.8 | 0.12 | 102 | 3 |
| PVA-5 | 656 | 171 | 25 | MMM | 101 | 40 | 4 | 30 | 1.1 | 0.09 | 115 | 5 |
| PVA-6 | 656 | 171 | 25 | MMM | 101 | 40 | 4 | 30 | 1.1 | 0.085 | 118 | 5 |
| PVA-7 | 656 | 97 | 23 | DMM | 83 | 40 | 4 | 32 | 1.3 | 0.03 | 105 | 4 |
| PVA-8 | 656 | 111 | 23 | MA | 67 | 40 | 4 | 32 | 1.3 | 0.03 | 105 | 4 |
| PVA-9 | 656 | 171 | 23 | IA | 98 | 40 | 4 | 32 | 1.3 | 0.10 | 105 | 4 |
| PVA-10 | 729 | 170 | 18 | — | — | 36 | 4 | 32 | 1.3 | 0.06 | 102 | 4 |
| PVA-11 | 750 | 83 | 20 | MMM | 313 | 35 | 4 | 30 | 1.5 | 0.30 | 105 | 4 |
| PVA-12 | 656 | 171 | 25 | MMM | 101 | 40 | 4 | 30 | 3.0 | 0.02 | 95 | 3 |
| PVA-13 | 656 | 171 | 25 | MMM | 101 | 40 | 4 | 30 | 0.1 | 0.08 | 120 | 6 |

MMM: Monomethyl maleate
DMM: Dimethyl maleate
MA: Maleic anhydride
IA: Itaconic acid

TABLE 2

| | PVA | Modifier | Monomer unit having two carboxyl groups mol % | Degree of saponification mol % | Degree of polymerization | X/(X + Y) | Water solubility (Before packaging of chemical) [sec] | Rating |
|---|---|---|---|---|---|---|---|---|
| Example 1 | PVA-1 | MMM | 4.0 | 96.0 | 1200 | 0.88 | 28 | Good |
| Example 2 | PVA-2 | MMM | 2.0 | 93.0 | 1800 | 0.89 | 38 | Good |
| Example 3 | PVA-3 | MMM | 4.0 | 99.5 | 1200 | 0.87 | 30 | Good |
| Example 4 | PVA-4 | MMM | 4.0 | 96.0 | 1200 | 0.67 | 26 | Good |
| Example 5 | PVA-5 | MMM | 4.0 | 96.0 | 1200 | 0.92 | 34 | Good |
| Example 6 | PVA-6 | MMM | 4.0 | 96.0 | 1200 | 0.96 | 37 | Good |
| Example 7 | PVA-7 | DMM | 3.0 | 88.0 | 1500 | 0.87 | 30 | Good |
| Example 8 | PVA-8 | MA | 3.0 | 88.0 | 1500 | 0.85 | 30 | Good |
| Example 9 | PVA-9 | IA | 4.0 | 96.0 | 1500 | 0.87 | 29 | Good |
| Comp. Example 1 | PVA-10 | — | — | 96.0 | 1700 | — | 120 | Poor |
| Comp. Example 2 | PVA-11 | MMM | 11.0 | 96.0 | 1200 | 0.81 | 21 | Good |

TABLE 2-continued

| | | | | | | | | |
|---|---|---|---|---|---|---|---|---|
| Comp. Example 3 | PVA-12 | MMM | 4.0 | 80.0 | 1200 | 0.48 | 25 | Good |
| Comp. Example 4 | PVA-13 | MMM | 4.0 | 96.0 | 1500 | 1.0 | 42 | Poor |

| | Chemical resistance | | Practical properties | | |
|---|---|---|---|---|---|
| | Water solubility (After packaging of chemical) [sec] | Rating | Young's modulus [kg/mm²] | Strength [kg/cm²] | Rating |
| Example 1 | 31 | Good | 3.2 | 3.1 | Good |
| Example 2 | 39 | Good | 3.4 | 3.3 | Good |
| Example 3 | 32 | Good | 3.3 | 3.2 | Good |
| Example 4 | 30 | Good | 2.4 | 2.2 | Good |
| Example 5 | 36 | Good | 3.3 | 3.2 | Good |
| Example 6 | 37 | Good | 3.3 | 3.2 | Good |
| Example 7 | 33 | Good | 3.3 | 3.1 | Good |
| Example 8 | 33 | Good | 3.3 | 3.1 | Good |
| Example 9 | 31 | Good | 3.3 | 3.2 | Good |
| Comp. Example 1 | Insoluble | Poor | 3.3 | 3.2 | Good |
| Comp. Example 2 | 25 | Good | 1.0 | 1.4 | Poor |
| Comp. Example 3 | 32 | Poor | 1.5 | 1.3 | Poor |
| Comp. Example 4 | 46 | Good | 3.5 | 3.4 | Good |

INDUSTRIAL APPLICABILITY

The above results demonstrate that when water-soluble films are produced using the modified PVA of the present invention which contains a predetermined amount of a monomer unit having two carboxyl groups and for which the value of X/(X+Y) calculated using the integral (X) from 6.8 to 7.2 ppm and integral (Y) from 5.3 to 5.5 ppm in $^1$H-NMR spectroscopy falls within a predetermined range, the water-soluble films are superior in cold water solubility and in practical properties such as strength and stiffness and can resist deterioration in various properties such as chemical resistance over time. In addition, such water-soluble films have a surface appearance suitable for use as a packaging material. The water-soluble film of the present invention is therefore useful in a wide variety of fields, such as the fields of packaging materials for chemicals, such as detergents for clothes, bleaches, and agricultural chemicals, which may be in the form of a liquid, powder, granule, or block.

The invention claimed is:

1. A modified polyvinyl alcohol produced by a method comprising saponification using a saponification starting solution comprising more than 1.0 mass % and less than 2.0 mass % of water, comprising 0.05 to 10 mol % of a monomer unit having two carboxyl groups, wherein in $^1$H-NMR spectroscopy of the modified polyvinyl alcohol, an integral (X) from 6.8 to 7.2 ppm and an integral (Y) from 5.3 to 5.5 ppm satisfy the following expression:

0.60≤X/(X+Y)<1.0.

2. The modified polyvinyl alcohol according to claim 1, wherein the monomer unit having two carboxyl groups is derived from at least one selected from the group consisting of an unsaturated dicarboxylic acid, an unsaturated dicarboxylic acid anhydride, and an unsaturated dicarboxylic acid ester.

3. The modified polyvinyl alcohol according to claim 1, wherein the monomer unit having two carboxyl groups is derived from at least one monomer having two carboxyl groups, the at least one monomer being selected from the group consisting of maleic acid, monomethyl maleate, monoethyl maleate, dimethyl maleate, diethyl maleate, maleic anhydride, itaconic acid, monomethyl itaconate, monoethyl itaconate, dimethyl itaconate, and diethyl itaconate.

4. The modified polyvinyl alcohol according to claim 1, comprising a structural unit formed from at least an amount of the monomer unit having two carboxyl groups, the structural unit being represented by formula (I):

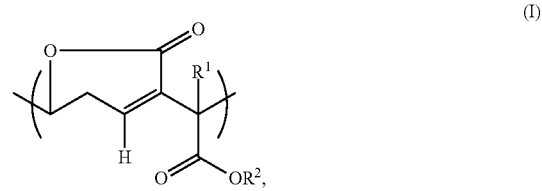

wherein:
R$^1$ represents a hydrogen atom or a linear or branched alkyl group having 1 to 8 carbon atoms; and
R$^2$ represents a metal atom, a hydrogen atom, or a linear or branched alkyl group having 1 to 8 carbon atoms.

5. The modified polyvinyl alcohol according to claim 1, having a viscosity-average degree of polymerization of 300 to 3000 and a degree of saponification of 82.0 to 99.9 mol %.

6. A water-soluble film, comprising the modified polyvinyl alcohol according to claim 1.

7. The water-soluble film according to claim 6, further comprising a plasticizer.

8. The water-soluble film according to claim 6, further comprising a surfactant.

9. A package, comprising a chemical and the water-soluble film according to claim 6, the chemical being enclosed by the water-soluble film.

10. The package according to claim 9, wherein the chemical is an agricultural chemical or a detergent.

11. The modified polyvinyl alcohol according to claim 1, wherein the content of the monomer unit having two carboxyl groups is 2.0 to 10 mol %.

* * * * *